May 10, 1932. G. A. HOWELL 1,857,722
SUPPORT
Filed Nov. 23, 1931
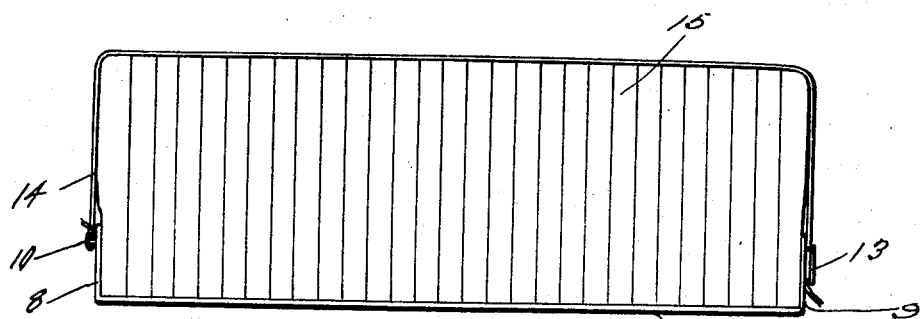
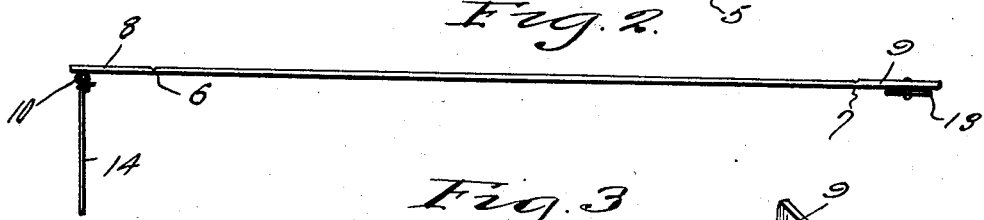
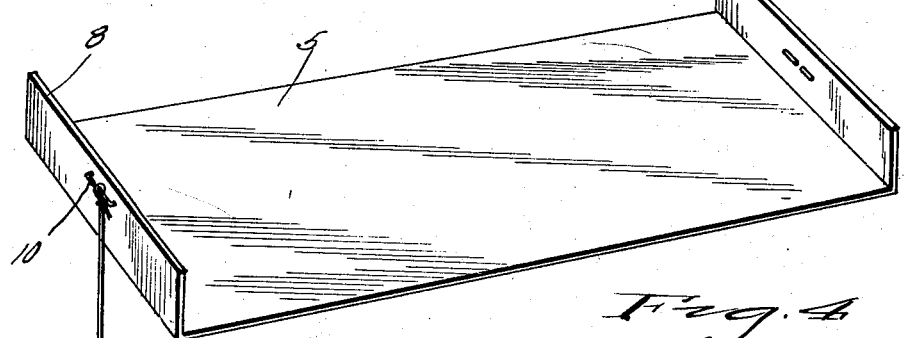
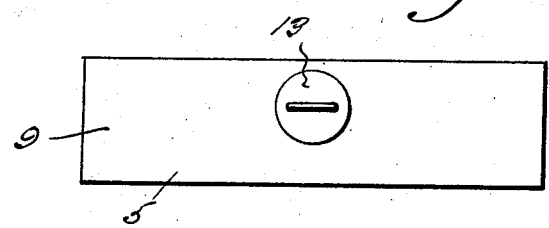
Inventor
George A. Howell
By Clarence A. O'Brien
Attorney Patented May 10, 1932

1,857,722

UNITED STATES PATENT OFFICE

GEORGE A. HOWELL, OF ROCK HILL, SOUTH CAROLINA

SUPPORT

Application filed November 23, 1931. Serial No. 576,931.

This invention appertains to new and useful improvements in supports and more particularly to a novel support for sliced bread.

The principal object of this invention is to provide a novel support upon which sliced bread can be placed in a manner whereby it can be conveniently removed when needed.

Other important objects and advantages of the invention will become apparent to the reader of the following specification.

In the drawings:—

Figure 1 represents a side elevational view of the invention with a loaf of sliced bread supported thereon.

Fig. 2 represents an edge elevational view of the device before it is formed to receive the bread.

Fig. 3 represents a perspective view of the support in its entirety.

Figure 4 represents an end elevational view of the support.

Referring to the drawings wherein like numerals designate like parts, it can be seen that this support consists of an elongated rectangular shaped plate 5 of cardboard or some other similar material, which is scored on the transverse lines 6—7 adjacent the opposite ends thereof, so that when the plate is ready for use, the portions beyond these scored lines 6—7 are bent upwardly to provide upstanding flanges 8—9. (See Fig. 3.)

An anchor 10 is provided on the outside of the flange 8. The flange 9 on its outer side has a button 13 secured thereto and a string or strand of some other character denoted by numeral 14 is secured at one end to the aforementioned fastener 10 and can be disposed over a loaf of sliced bread 15 for securing the sliced bread in the manner shown in Fig. 1 after the free end of the strand has been convoluted around the button 13, in the manner substantially shown in Fig. 1.

While the foregoing specification sets forth the invention in specific terms, it is to be understood that numerous changes in the shape, size, and materials may be resorted to without departing from the spirit and scope of the invention as claimed hereinafter.

Having thus described my invention, what I claim as new is:—

A holder for sliced bread comprising an elongated plate provided at each end with an upstanding flange, an anchor on one of the flanges, a flexible strand secured at one end to the anchor, and a button on the remaining flange around which the strand can be wound at its opposite end portion after being disposed over sliced bread placed on the plate.

In testimony whereof I affix my signature.

GEORGE A. HOWELL.